(No Model.)
W. U. COLTHAR.
FASTENING DEVICE FOR WHEEL TIRES.
No. 467,083. Patented Jan. 12, 1892.
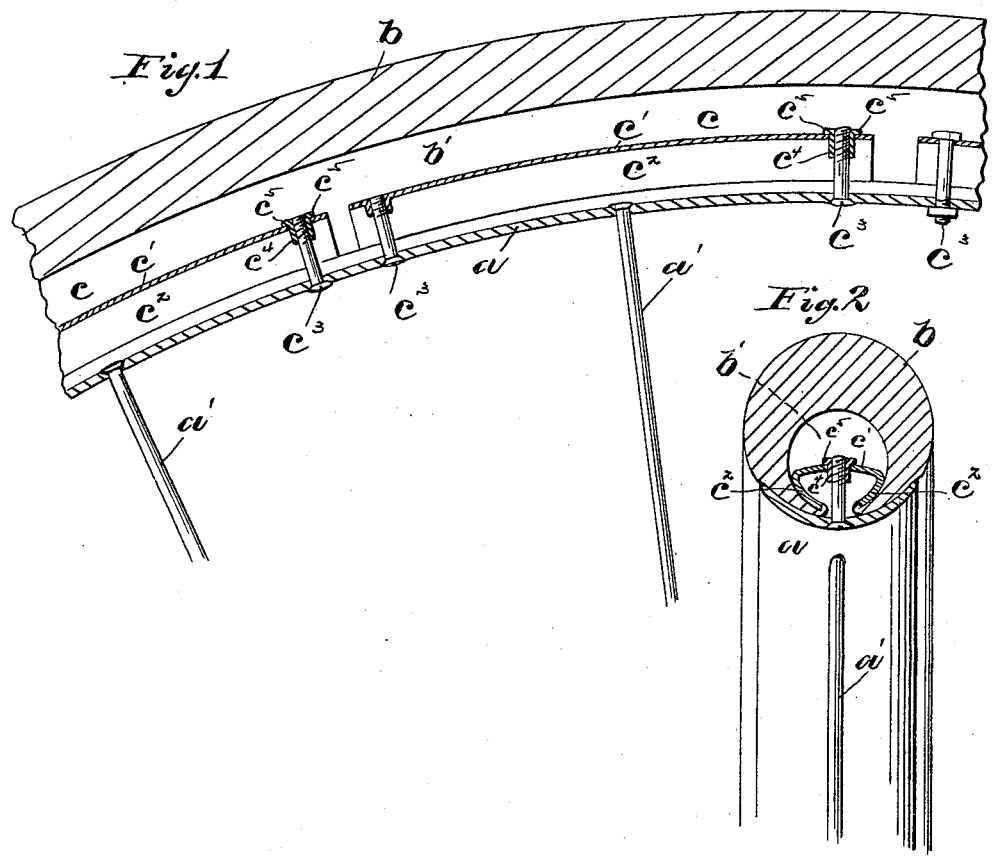
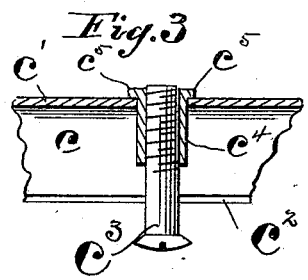
Witnesses
Chas. I. Welch
Jno. L. Plummer
Inventor
William U. Colthar
By Shirley Shepherd
Attorneys

UNITED STATES PATENT OFFICE.

WILLIAM U. COLTHAR, OF SPRINGFIELD, OHIO.

FASTENING DEVICE FOR WHEEL-TIRES.

SPECIFICATION forming part of Letters Patent No. 467,083, dated January 12, 1892.

Application filed June 13, 1891. Serial No. 396,070. (No model.)

*To all whom it may concern:*

Be it known that I, WILLIAM U. COLTHAR, a citizen of the United States, residing at Springfield, in the county of Clark and State of Ohio, have invented certain new and useful Improvements in Fastening Devices for Vehicle-Tires, of which the following is a specification.

My invention relates to a fastening device for vehicle-tires, the device being especially adapted for use with hollow cushion-tires used on bicycles and similar vehicles.

The object of my invention is to provide a simple and effective fastening device by means of which a rubber or similar tire may be readily secured to the rim or felly of a vehicle-wheel by mechanical means and without the aid of the usual cement or other adhesive material. I accomplish this object by the constructions shown in the accompanying drawings, in which—

Figure 1 is a longitudinal sectional view of the rim of a vehicle-wheel and its tire to which my improved fastening device has been applied. Fig. 2 is a transverse sectional view of the same. Fig. 3 is a detailed view of the clamping-screw enlarged.

Like parts are indicated by similar letters of reference in the several views.

In the said drawings, $a$ represents the rim or felly of a vehicle-wheel, preferably made of metal and curved to conform to the outer periphery of the tire $b$, connected to said rim, this tire being preferably made of rubber or similar material, substantially the same as now employed on bicycles and similar vehicles. The rim $a$ is connected to the hub in the usual way by spokes $a'$ to form a wheel. The tire $b$, being of flexible or elastic material, is also formed hollow, with an inner chamber $b'$ extending entirely through the said tire and around the periphery of the rim $a$, the said tire being preferably formed endless in a well-known manner. Connecting with the chamber $b'$ is a slotted opening $b^2$, which also extends entirely around the said tire on the inner periphery thereof. The approximate edges of the tire on opposite sides of the opening $b^2$ are preferably provided with projecting shoulders $b^3$, also extending entirely around said tire and projecting inwardly into the chamber $b'$.

Arranged at intervals around the periphery of the rim $a$ and within the chamber $b'$ of the tire $b$ are clamping-plates $c$, formed with a central body $c'$, preferably slightly curved or arched in an opposite direction to the curve of the rim $a$, and provided with inwardly-extending side wings or flanges $c^2$, curved to conform to the inner walls of the chamber $b'$, with their approximate edges adapted to rest in contact with the extended projections or shoulders $b^3$ on said tire. Extending through the rim $a$ and engaging with the clamping-plates $c$ are clamping-screws $c^3$, adapted to draw the plates $c$ firmly against the approximate edges of the open tire, bringing them closely against the periphery of the rim $a$, and thus firmly clamp said tire in said rim.

For the clamping-screws any desired form of screw or bolt may be used adapted to pass through or into the respective parts $a$ and $c'$. I preferably employ, however, a plain machine-screw with a sleeve-nut $c^4$, having projecting flanges $c^5$, the sleeve-nut being adapted to extend through the arched portion $c'$ of the clamping-plate $c$, with the flanges $c^5$ resting against said plate, as shown in Fig. 3.

The clamping-plates $c$ may be made of any desired or suitable length, a sufficient number of said plates being used to extend entirely around the periphery of the rim $a$, forming a sectional fastener, which may be readily applied within the chamber $b'$ of the tire. The arrangement of the clamping-plate with the arched body and inwardly-curved wings or flanges causes the said plates to bind firmly and evenly against the inner periphery of the tire, the central plate, wings, and flanges being joined by curved or rounded corners $c^6$, which prevents any undue wear on the flexible tire by the yielding movement of the same in operation. The arch form of the central plate also causes the side wings to impinge firmly against that portion of the tire opposite the edges of the periphery of the rim, thus holding said tire firm throughout the entire cross-section of said rim, the projections $b^3$ preventing any possible displacement of the respective parts.

Having thus described my invention, I claim—

1. The combination, with a cushion-tire for vehicle-wheels having a slotted opening forming a divided tire, the approximate edges of which are provided with shoulders or projections, of sectional clamping-plates the sides of which have inwardly-extending wings shaped to conform to the inner walls of said tire and adapted to engage the shoulders or projections thereon, an arched body extending transversely across the tire and connecting said side wings, and fastening-screws independent of the wheel-spokes for securing said clamping-plates to the wheel-rim or felly, whereby a removable tire is secured, substantially as specified.

2. The combination, with a hollow divided rubber tire with inwardly-projecting shoulders on the approximate edges, of sectional clamping-plates having inwardly-extending wings shaped to correspond to the inner walls of said tire and engage with the shoulders or projections thereon, said wings being connected by a transverse body which extends across the tire at or below the center of the inner hollow portion, substantially as specified.

In testimony whereof I have hereunto set my hand this 10th day of June, A. D. 1891.

WILLIAM U. COLTHAR.

Witnesses:
R. D. BALDWIN,
CHAS. I. WELCH.